(12) United States Patent
Jones et al.

(10) Patent No.: US 9,139,131 B2
(45) Date of Patent: Sep. 22, 2015

(54) ILLUMINATED VEHICLE WARNING SYSTEM

(71) Applicant: BLC PAWS, LLC, Atlanta, GA (US)

(72) Inventors: Markley L. Jones, Atlanta, GA (US); Joseph L. Edwards, Sandy Springs, GA (US); Matthew L. Edwards, Brookhaven, GA (US); John E. Zamer, Sandy Springs, GA (US); Piotr A. Folkert, Johns Creek, GA (US); James B. Sirmon, Twickenham (GB)

(73) Assignee: BLC PAWS, LLC, Atlanta, GA (US)

( * ) Notice: Subject to any disclaimer, the term of this patent is extended or adjusted under 35 U.S.C. 154(b) by 0 days.

(21) Appl. No.: 14/155,164

(22) Filed: Jan. 14, 2014

(65) Prior Publication Data

US 2015/0197182 A1 Jul. 16, 2015

(51) Int. Cl.
| | |
|---|---|
| *B60Q 1/50* | (2006.01) |
| *G08B 21/00* | (2006.01) |
| *B60Q 1/44* | (2006.01) |
| *B60Q 1/26* | (2006.01) |
| *B60Q 1/52* | (2006.01) |

(52) U.S. Cl.
CPC .............. *B60Q 1/444* (2013.01); *B60Q 1/2696* (2013.01); *B60Q 1/525* (2013.01)

(58) Field of Classification Search
CPC .......... B60Q 1/444; B60Q 1/44; B60Q 1/302; B60Q 1/52; B60Q 1/445; B60Q 1/448; B60Q 1/447; B60Q 2900/30; B60Q 1/26; B60Q 1/441; B60Q 1/54; B60Q 2300/054; B60Q 1/2696; B60Q 2300/112; B60R 2021/01311; B60R 25/104; B60W 20/1062; B60W 30/18127

USPC ................................... 340/467, 463–479, 453
See application file for complete search history.

(56) References Cited

U.S. PATENT DOCUMENTS

| | | |
|---|---|---|
| 3,528,056 A | 9/1970 | Veovodsky |
| 3,846,749 A | 11/1974 | Curry |

(Continued)

FOREIGN PATENT DOCUMENTS

| | | |
|---|---|---|
| DE | 4406339 | 8/1995 |
| DE | 102005059688 | 6/2007 |

(Continued)

OTHER PUBLICATIONS

Nguyen, Tai T., "Notice of Allowance", U.S. Appl. No. 12/593,843, filed Sep. 29, 2009; Mailed Jan. 23, 2012.

(Continued)

*Primary Examiner* — Jennifer Mehmood
*Assistant Examiner* — Emily C Terrell
(74) *Attorney, Agent, or Firm* — Philip H. Burrus, IV (57) ABSTRACT

An illuminative device (100) includes a control circuit (101), an acceleration detector (102) operable with the control circuit, and a plurality of light sources (103) operable with the control circuit. The control circuit is to receive an input (108) from the acceleration detector indicating deceleration (601) exceeds a predetermined threshold (662). Upon receipt of the input, the control circuit is to deliver a time-varying control signal to continuously illuminate the plurality of light sources with an illumination level varying between a first non-zero illumination level (664) and a second non-zero illumination level (665) in accordance with a frequency of the time-varying control signal.

20 Claims, 10 Drawing Sheets

(56) References Cited

U.S. PATENT DOCUMENTS

| | | | |
|---|---|---|---|
| 3,875,559 A | 4/1975 | Szekessy | |
| 4,751,493 A | 6/1988 | Miller | |
| 4,916,584 A | 4/1990 | Gustafson | |
| 4,924,207 A | 5/1990 | Lariscy | |
| 5,150,098 A | 9/1992 | Rakow | |
| 5,231,373 A | 7/1993 | Freeman et al. | |
| 5,345,218 A | 9/1994 | Woods et al. | |
| 5,565,841 A | 10/1996 | Pandohie | |
| 5,764,141 A | 6/1998 | Chang | |
| 6,133,852 A | 10/2000 | Tonkin | |
| 6,177,866 B1 | 1/2001 | O'Connell | |
| 6,198,236 B1 * | 3/2001 | O'Neill | 315/307 |
| 6,411,204 B1 | 6/2002 | Bloomfield | |
| 6,744,359 B1 * | 6/2004 | Wasilewski et al. | 340/467 |
| 7,154,387 B2 | 12/2006 | Boomershine, III | |
| 7,722,106 B2 * | 5/2010 | Bunsmann | 296/50 |
| 7,768,385 B1 | 8/2010 | Juranovich et al. | |
| 8,144,004 B2 | 3/2012 | Polak et al. | |
| 8,192,063 B2 | 6/2012 | Neufeglise | |
| 8,400,286 B2 * | 3/2013 | Pusch | 340/435 |
| 2006/0187011 A1 * | 8/2006 | van der Meer et al. | 340/438 |
| 2009/0134987 A1 | 5/2009 | Oltmann et al. | |
| 2010/0085180 A1 | 4/2010 | Mathis | |
| 2011/0101868 A1 * | 5/2011 | Weiss | 315/130 |
| 2014/0354422 A1 * | 12/2014 | Olson et al. | 340/465 |
| 2014/0375448 A1 | 12/2014 | Lee | |

FOREIGN PATENT DOCUMENTS

| | | |
|---|---|---|
| EP | 0436368 | 7/1998 |
| GB | 2351858 | 1/2001 |
| KR | 20130090670 | 8/2013 |
| WO | WO-0142045 | 6/2001 |
| WO | WO-2006/035957 | 6/2006 |
| WO | WO 2008/120045 | 10/2008 |
| WO | WO-2008120045 | 10/2008 |

OTHER PUBLICATIONS

PCT Search Report, "PCT Search Report for PCT/IB2007/051143", Filed Mar. 30, 2007; Mailed Nov. 27, 2007.

PCT Patentability Report, "PCT/IB2007/051143", International Preliminary Report on Patentability; Filed Mar. 30, 2007; Mailed Oct. 6, 2009.

Herewerth, Sabine "PCT Search Report", PCT/US2015/011024; Filed Jan. 12, 2015; Mailed May 12, 2015.

* cited by examiner

ILLUMINATED VEHICLE WARNING SYSTEM

BACKGROUND

1. Technical Field

This disclosure relates generally to electronic devices, and more particularly to lighted electronic devices.

2. Background Art

Driving a car is both a luxury and a liability. It is a luxury in that a person fortunate enough to own an automobile is afforded freedom to travel wherever they may desire to go. It is a liability in that there are so many drivers today, driving at increased speeds, that the roads and highways of the world can be a dangerous place as collisions frequently occur between automobiles.

One of the more prevalent collisions occurs when one car hits another in the rear. This type of accident is colloquially known as "rear ending." Rear-ending often occurs when a trailing car drives so closely to a leading car that, when the leading car stops, the driver of the trailing car has insufficient time in which to satisfactorily apply the brakes. Many authorities recommend the "three second rule" for the trailing car in which the trailing car should pass the same fixed object at least three seconds after the leading car. This temporal measurement translates into different distances at different speeds. Illustrating by example, at twenty-five miles per hour the three-second rule results in a distance of 111 feet, while 288 feet is required to meet the rule when traveling at sixty-five miles per hour.

Unfortunately, many drivers do not follow the three-second rule. Whether in a hurry, emotionally frustrated, or for other reasons, some drivers simply follow too closely behind a leading car. When the leading car stops, the trailing car cannot stop and rear-ends the leading car. The problem is exacerbated in inclement weather such as snow or ice. Moreover, even a driver abiding by the three-second rule still runs the risk of rear ending a leading car if the leading driver perpetually lightly steps on the brakes, thereby leaving the trailing driver unsure of whether the leading car is stopping or continuing to proceed. Accidents can occur in any of these situations.

It would be advantageous to have a method and device to reduce the risk of such accidents.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to illuminative devices. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of operating an illuminative device as described herein. The non-processor circuits may include, but are not limited to, a radio receiver, a radio transmitter, signal drivers, clock circuits, power source circuits, and user input devices. As such, these functions may be interpreted as steps of a method to perform the operation of one or more illuminative devices as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide an illuminative device that can be mounted in the window, rear window, or windshield of a vehicle, or alternatively integrated with the window, rear window, or windshield of a vehicle. In one embodiment, the illuminative device includes a control circuit, an acceleration detector, and a plurality of light sources that are operable with the control circuit. When the acceleration detector, which is a multi-dimensional accelerometer in one embodiment, detects deceleration in excess of a predetermined threshold, such as 0.75 standard gravity units (g), the control circuit receives a signal indicative of the threshold being exceeded. The control circuit can then deliver a signal to continuously illuminate the plurality of light sources.

In one embodiment, the control circuit is operable to deliver a time-varying control signal to continuously illuminate the plurality of light sources. To ensure the light sources stay continuously illuminated, rather than the time-varying control signal having one or more zero crossings, in one embodiment the time-varying illumination control signal varies between that necessary to illuminate the plurality of light sources at a first non-zero illumination level and that necessary to illuminate the plurality of light sources at a second-non zero illumination level. Illustrating by example, the first non-zero illumination level may be less than thirty percent of a maximum output illumination level of the plurality of light sources, such as about twenty percent. (The term "about" is used herein to refer to a parameter inclusive of manufacturing tolerances. Thus, if a drive signal of one Ampere was needed to fully illuminate one or more of the light sources, a drive signal of "about" twenty percent, where the manufacturing and system tolerances were plus or minus five percent, would include values between 0.19 and 0.21 Amperes.) By contrast, the second non-zero illumination level may be that necessary to cause the plurality of light sources to illuminate to over eighty percent of the maximum output illumination level, such as about ninety, about ninety-five, or even about one hundred percent of their maximum output illumination level.

In one embodiment, a control circuit is operable with a plurality of light sources arranged as a warning triangle. The warning triangle can be affixed to or incorporated into the rear window, window, windshield, or other portion of a vehicle. In one embodiment, the plurality of light sources illuminate automatically when the vehicle rapidly decelerates and/or very quickly stops. This can be due to a sudden deceleration or a sudden stop that is more rapid than a normal brake-assisted stop. In another embodiment, the plurality of light sources is to illuminate by remote activation at any time by the vehicle driver. When the plurality of light sources illuminates, the light emitted provides a warning, in a dramatic and very noticeable fashion, to drivers of other vehicles behind the subject vehicle of the rapid deceleration or stopping, or generally the existence of, the subject vehicle.

Figure 1:
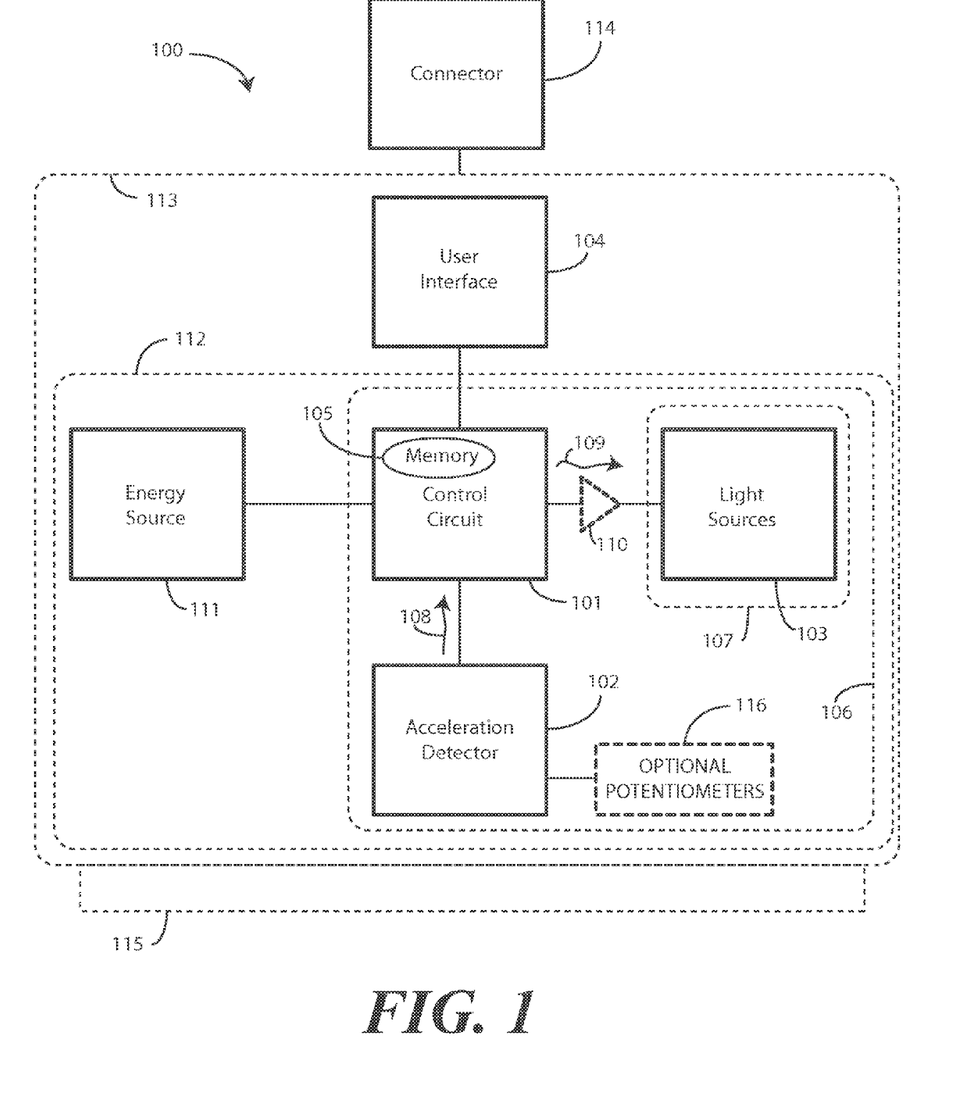
FIG. 1 illustrates one explanatory illuminative device in accordance with one or more embodiments of the disclosure.

Turning now to FIG. 1, illustrated therein is one explanatory illuminative device 100 configured in accordance with one or more embodiments of the disclosure. The illustrative illuminative device 100 of FIG. 1 includes a control circuit 101, an acceleration detector 102, and a plurality of light sources 103. In one embodiment, the control circuit 101 is operable with the acceleration detector 102. In one embodiment, the plurality of light sources 103 is also operable with the control circuit 101.

In one embodiment, the control circuit 101 comprises one or more processors. The control circuit 101 can be responsible for performing the various functions of the illuminative device 100. The control circuit 101 can be a microprocessor, a group of processing components, one or more Application Specific Integrated Circuits (ASICs), programmable logic, or other type of processing device. The control circuit 101 can be operable with the user interface 104, as well as various peripheral ports (not shown) that can be coupled to peripheral hardware devices and/or energy sources via interface connections.

In one embodiment, the control circuit 101 can be configured to process and execute executable software code to perform the various functions of the illuminative device 100. A storage device, such as memory 105, can be used to store any executable software code used by the control circuit 101 for device operation. The executable software code used by the control circuit 101 can be configured as one or more modules that are operable with the control circuit 101. Such modules can store instructions, control algorithms, and so forth. The instructions can instruct processors or the control circuit 101 to perform the various steps, including light source actuation, receipt of user control from the user interface 104, and the corresponding methods described below.

In one embodiment, the various circuit components can be powered by an energy source 111. The energy source 111 can be integral with, or separate from, the illuminative device 100. For example, in one embodiment the energy source 111 is an electrochemical battery that is integrated into a housing or chassis of the illuminative device 100. In one embodiment, the electrochemical battery can be a rechargeable battery such as a lithium-ion or lithium-polymer battery. In one embodiment, the electrochemical battery can be a single-use battery such as an alkaline battery. The use of an energy source 111 that is integral with the illuminative device 100 eliminates the need for factory installation of the illuminative device 100 to connect to vehicular wiring or systems. In other embodiments, the energy source 111 can be integral to a vehicle and coupled to the illuminative device by an electrical connector. In the latter embodiment, the illuminative device 100 may include an AC-DC converter (not shown) or other power regulation circuitry to convert power being delivered by the vehicle's power source into power that is usable by the control circuit 101 and other circuit components.

In one embodiment, the plurality of light sources 103 comprises an array of light emitting diode (LED) light sources. LEDs work well with embodiments of the disclosure due to the fact that they are compact, easily disposed on or integrated with a housing or chassis, and consume small amounts of power while being capable of large illumination outputs. In one embodiment, the plurality of light sources 103 comprise one of white LEDs capable of emitting red light or red LEDs capable of emitting white light. In another embodiment, the plurality of light sources 103 comprises LED tape. While LEDs are one example of light sources, others will be obvious to those having the benefit of this disclosure.

In one embodiment, the acceleration detector 102 comprises a multi-axis accelerometer. In another embodiment, the acceleration detector 102 comprises a single-axis accelerometer. The acceleration detector 102 detects the deceleration force acting upon the illuminative device 100 and, when the deceleration force exceeds a predetermined threshold, such as 0.75 g, delivers an input 108 to the control circuit 101. Note that 0.75 g is but one explanatory predetermined threshold in accordance with embodiments of the disclosure. Other predetermined thresholds will be obvious to those of ordinary skill in the art having the benefit of this disclosure. For example, in another embodiment the predetermined threshold is 1.0 g.

In one or more embodiments, the threshold can be established using one or more optional potentiometers 116. Where the acceleration detector 102 comprises a multi-axis accelerometer, the one or more optional potentiometers 116 can be used to establish thresholds for different directions. For example, a first potentiometer can be used to establish a threshold along the X-axis, while a second potentiometer can be used to establish a same (or a different) threshold along the Y-axis. Where the acceleration detector 102 comprises a single-axis accelerometer, the one or more potentiometers 116 can be used to establish thresholds along the positive X-axis, the negative X-axis, or combinations thereof. While both types of acceleration detectors work well in practice, using a multi-axis accelerometer has an advantage of being able to function in any orientation. Additionally, another benefit of sensing acceleration in two dimensions is that if a vehicle goes into a spin or goes wildly out of control, acceleration will still be measured and the plurality of light sources 103 will be able to illuminate.

In addition, the one or more potentiometers 116 can be used to adjust how brightly the plurality of light sources 103 illuminates. In another embodiment, the one or more potentiometers 116 can be used to adjust how long the plurality of light sources 103 illuminate. In another embodiment, the one or more potentiometers 116 can be used to adjust when the plurality of light sources 103 illuminates. In another embodiment, the one or more potentiometers 116 can be used to adjust fade in characteristics or fade out characteristics for the plurality of light sources 103. Other uses for the one or more potentiometers 116 will be obvious to those of ordinary skill in the art having the benefit of this disclosure.

In one or more embodiments, the predetermined threshold is sufficiently low that deceleration resulting from sudden braking forces applied to the illuminative device 100 will be detected easily, but sufficiently high that the predetermined threshold will not be reached during normal operation, such as during normal acceleration or deceleration. Experimental testing has determined that a predetermined threshold of between 0.5 g and 1.0 g tend to perform well in this respect. Accordingly, in one embodiment, the predetermined threshold is about 0.75 g, but others can be used without departing from the spirit and scope of the disclosure.

In one or more embodiments, the control circuit 101 receives input 108 from the acceleration detector 102. In one embodiment, the control circuit 101 continually receives the input 108 from the acceleration detector 102.

In one embodiment, the control circuit 101 filters the input 108 to determine whether it is valid. Illustrating by example, in one embodiment two conditions must be met for the control circuit 101 to detect the input 108 as a valid input. A first condition can include the input 108 comprising a predetermined minimum number of acceleration readings exceeding the predetermined threshold along one axis. In another embodiment, the condition can include the input 108 comprising a predetermined minimum number of acceleration readings exceeding the predetermined threshold along two axes.

In one embodiment, a second condition can include the successive input readings each having a progressively increasing value. For example, where the first condition can includes the input 108 comprising a predetermined minimum number of acceleration readings exceeding the predetermined threshold along one axis, the second condition may require each successive reading to increase in magnitude. Accordingly, three readings of 0.6 g, 0.5 g, and 0.7 g would not be determined valid by the control circuit 101, while three readings of 0.6 g, 0.65 g, and 0.8 g would be determined valid by the control circuit. Other conditions precedent will be obvious to those of ordinary skill in the art having the benefit of this disclosure.

In one embodiment, when both conditions are met in these three consecutive readings, the control circuit 101 determines the input 108 to be a valid deceleration input. The control circuit 101 then delivers a control signal 109 to illuminate the plurality of light sources 103 with a predetermined illumination output level. Using this "two condition" embodiment advantageously works to avoid false actuation of the plurality of light sources due to, for example bumps in the road.

In one embodiment, when the control circuit 101 receives the input 108 from the acceleration detector 102 indicating that the absolute value of the negative acceleration force being applied to the acceleration detector 102 exceeds the predetermined threshold, the control circuit 101 delivers a control signal 109 to illuminate the plurality of light sources 103 with a predetermined illumination output level. In one embodiment, the illuminative device 100 includes an optional current amplifier 110 to adequately drive the plurality of light sources 103 so that the predetermined illumination output level is reached.

Figure 6:
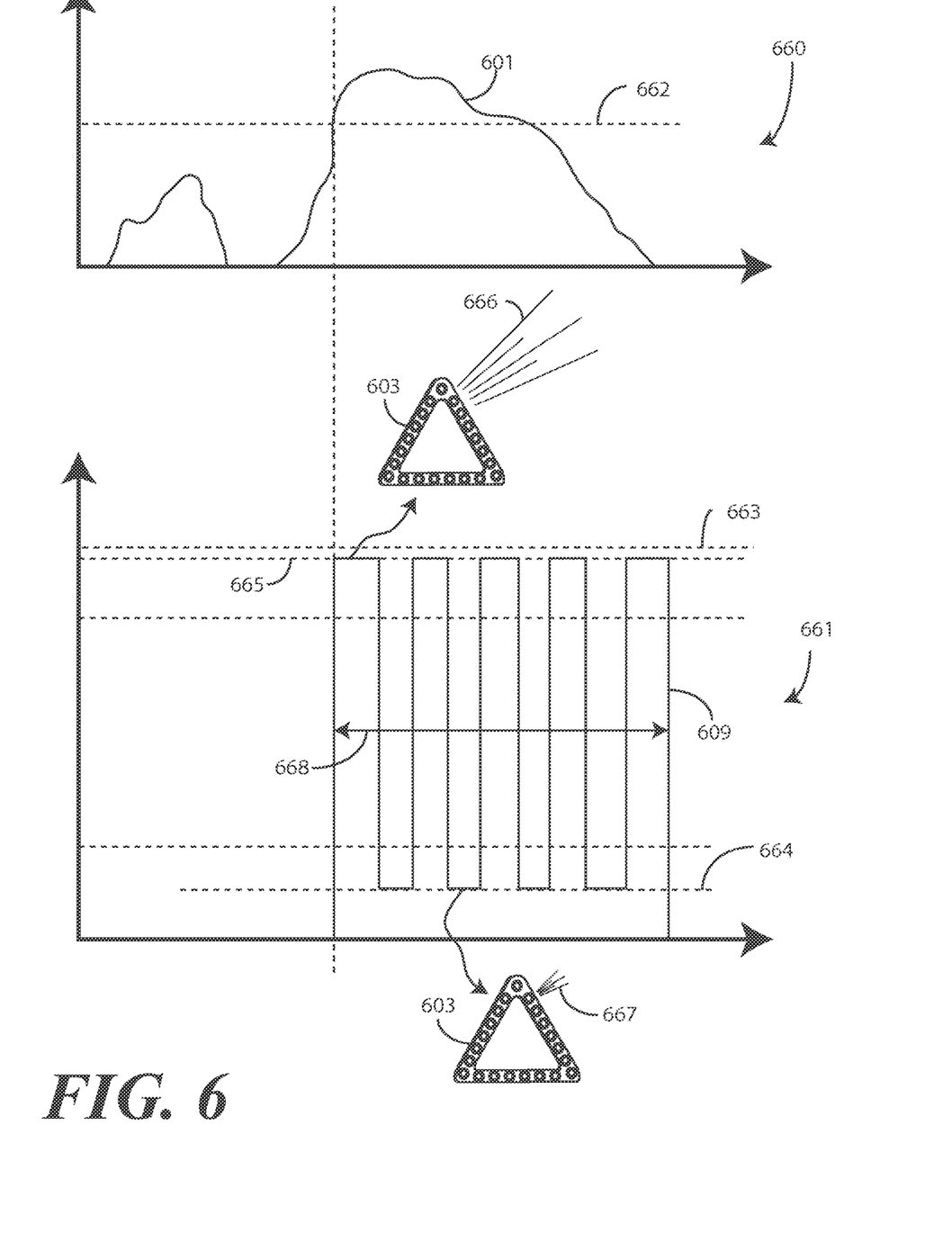
FIG. 6 illustrates an explanatory method in accordance with one or more embodiments of the disclosure.

In one embodiment, the control circuit 101 delivers the control signal 109 to continuously illuminate the plurality of light sources 103. As used herein, "continuously illuminate" means that when the control signal 109 is active, the plurality of light sources 103 continually emit light. Note that the illumination level output by the plurality of light sources 103 can change while they are being "continuously illuminated" however. For example, in one embodiment, the control circuit 101 delivers a time-varying control signal to continuously illuminate the plurality of light sources 103 with an illumination level that varies. As will be shown in more detail below with reference to FIGS. 6-8, in one embodiment this comprises the control circuit 101 delivering a control signal 109 that is time-varying to continuously illuminate the plurality of light sources 103 with an illumination level varying between a first non-zero illumination level and a second non-zero illumination level in accordance with a frequency of the time-varying control signal.

Causing illumination of the plurality of light sources 103 to vary, while staying continuously on by remaining on when the illumination level is at its lowest, provides a number of advantages over prior art designs. It is advantageous over prior art designs where light sources are illuminated at a constant level in that it provides a mnemonic device to following drivers that the illumination is due to deceleration, not due to a leading driver's habits in operating the brake pedal. Recall from above that in certain circumstances a trailing driver may not understand that a car is stopping due to a leading driver's continuous operation of the brake pedal. The time-varying illumination of the plurality of light sources 103 occurring in embodiments of the present disclosure is due to deceleration only and is distinct from the non-varying light operation occurring in conjunction with traditional brakes. Accordingly, embodiments of the disclosure provide a mnemonic device indicating to a following driver that deceleration of a leading vehicle is actually occurring.

A second advantage is provided by the fact that, in one or more embodiments, the plurality of light sources 103 need not "flash" or "blink," i.e., completely turn off when being driven by the time-varying control signal. Instead, in one or more embodiments they are continuously illuminated (continuous burn) with an illuminated level varying between a first non-zero illumination level and a second non-zero illumination level.

It should be noted that the plurality of light sources 103 can be illuminated synchronously by the time-varying control signal or asynchronously. Said differently, each light source of the plurality of light sources 103 can be illuminated at the same illumination level by the time-varying control signal in one embodiment. In other embodiments, one or more delay circuits can be coupled to light sources so that each is responsive to the time-varying control signal but is illuminated at a different illumination level. In other embodiments, a plurality of time-varying control signals can be delivered to the plurality of light sources 103 so that the light sources can be controlled individually or in sub-clusters.

In one embodiment, the user interface 104 is integrally formed into the illuminative device 100. For example, as will be shown in FIG. 2, the user interface 104 can comprise one or more buttons disposed along the illuminative device 100. In one embodiment, a first button is configured as a control switch to, when actuated, cause the control circuit 101 to deliver the control signal 109 to the plurality of light sources regardless of, i.e., independent of, whether the input 108 is being received from the acceleration detector 102. Where the control signal 109 is a time-varying control signal, this causes the plurality of light sources 103 to continuously illuminate with an illumination level varying between a first non-zero illumination level and a second non-zero illumination level in accordance with a frequency of the control signal 109. Accordingly, in such an embodiment the user can employ the control switch to manually actuate the plurality of light sources 103. This feature can be used, for example, when a driver has mechanical problems and wants to alert other drivers to the fact that their vehicle is immobile or otherwise experiencing compromised reliability.

In another embodiment, the user interface 104 can include a master switch to prevent illumination of the plurality of light sources 103 when actuated. Said differently, when the user interface 104 comprises a master switch, a user can actuate the master switch to prevent the plurality of light sources from actuation regardless of whether the input 108 from the acceleration detector 102 is received. Accordingly, a driver can turn the illuminative device 100 OFF by actuating the master switch. While the master switch and the controls switch are two examples of buttons or switches that can be included in the user interface 104, it will be clear to those of ordinary skill in the art having the benefit of this disclosure that other switches or control buttons may be included as well. Further, these switches or control buttons can be used in any combination.

In one embodiment, the user interface 104 is in wireless communication with the control circuit 101. For example, the user interface 104 can be configured as a remote control device in wireless communication with the control circuit across a wireless channel operating at 868 MHz or other suitable frequency. As will be shown in FIG. 3, in one embodiment the illuminative device 100 can be mounted in the rear window of a vehicle. Providing a user interface 104 that is wirelessly in communication with the control circuit 101 allows the user to control the illuminative device 100 while driving and without having to stop the car and reach over the back dash to access control buttons or switches disposed along a housing of the illuminative device 100.

As noted above, in one embodiment the plurality of light sources 103 are configured to selectively continuously illuminate with an illumination level varying between a first non-zero illumination level and a second non-zero illumination level in accordance with a frequency of the control signal 109. In one embodiment, the user interface 104 includes a control to vary the parameters of the control signal 109. For example, in one embodiment the user can operate the user interface 104 to vary the predetermined threshold at which the control signal 109 is delivered. While a default value may be 0.75 g, a user could accordingly alter this to 1.0 g, or 0.65 g, or another desired value using the user interface 104. Similarly, in another embodiment the user may employ the user interface 104 to selectively vary the frequency. If the default value is, for example, less than five Hertz, the user may elect to change this to 7, 8, or more Hertz using the user interface 104. The user may also employ the user interface 104 in some embodiments to alter the first non-zero illumination level and the second non-zero illumination level as well. Of course, combinations of the above can be used in one or more embodiments.

The various dashed line boxes of FIG. 1 are to illustrate various housing and/or chassis configurations for the illuminative device 100. As will be shown in subsequent figures, the illuminative device 100 can include a housing, a chassis, or combinations thereof in one embodiment. In one embodiment, the housing, chassis, or combination thereof includes a stand 115 so that it can be placed on the rear dashboard of a vehicle. In one embodiment, the housing, chassis, or combination thereof is flexible so that it can be twisted to fit a particular application. In another embodiment, the housing, chassis, or combination thereof is rigid. In other embodiments, the various components can be in separate housings and/or chassis. For example, the plurality of light sources 103 can be integrated into a window or windshield of a vehicle while the control circuit 101 and acceleration detector 102 are disposed in a separate housing.

In one embodiment, the control circuit 101, the plurality of light sources 103, and the acceleration detector 102 are disposed in or on a singular housing or chassis 106. In one embodiment, the control circuit 101 and the acceleration detector 102 are disposed in or on a singular housing or chassis 106, while the plurality of light sources 103 are disposed in or on another singular housing or chassis 107. For example, the control circuit 101 and the acceleration detector 102 can be disposed in a plastic housing while the plurality of light sources 103 are integrated into a window or windshield. Alternatively, the plurality of light sources 103 can be disposed in a first housing and/or chassis 107, while the remaining components are disposed in a separate housing and/or chassis 113 configured as a control box. In one embodiment, the control box is wirelessly in communication with a current source or current amplifier 110 to actuate the plurality of light sources 103 in accordance with the embodiments described herein.

In one embodiment, the control circuit 101, the plurality of light sources 103, the energy source 111, and the acceleration detector 102 are disposed in or on a singular housing or chassis 112 while the user interface 104 is separate. This may be the case, for example, where the user interface 104 is configured as a remote control that is wirelessly in communication with the control circuit 101. In one embodiment, the control circuit 101, the plurality of light sources 103, the energy source 111, the user interface 104, and the acceleration detector 102 are disposed in or on a singular housing or chassis 113. Such may be the case when the user interface 104 is configured as control buttons or switches disposed along the singular housing or chassis 113.

The various housing and/or chassis combinations can be used in combination. For example, while the control circuit 101, acceleration detector 102, and energy source 111 are not shown in a dashed line box, combining housing and/or chassis 106 with the plurality of light sources 103 separated out in housing and/or chassis 107 with housing and/or chassis 112 provides this example. Accordingly it is omitted for brevity. Furthermore, other housing and/or chassis examples will be obvious to those of ordinary skill in the art having the benefit of this disclosure.

In one embodiment, regardless of the housing and/or chassis combination used, the illuminative device 100 includes a detachable connector 114 to attach the housing and/or chassis to the window or windshield of a vehicle. In one embodiment, the detachable connector 114 comprises a suction cup. A suction cup is but one example of a detachable connector 114 suitable for use with embodiments of the disclosure. Others will be obvious to those of ordinary skill in the art having the benefit of this disclosure. For example, in another embodiment the detachable connector 114 comprises adhesive tape. In another embodiment, the detachable connector 114 comprises releasable adhesive material, such as releasable glue.

Figure 2:
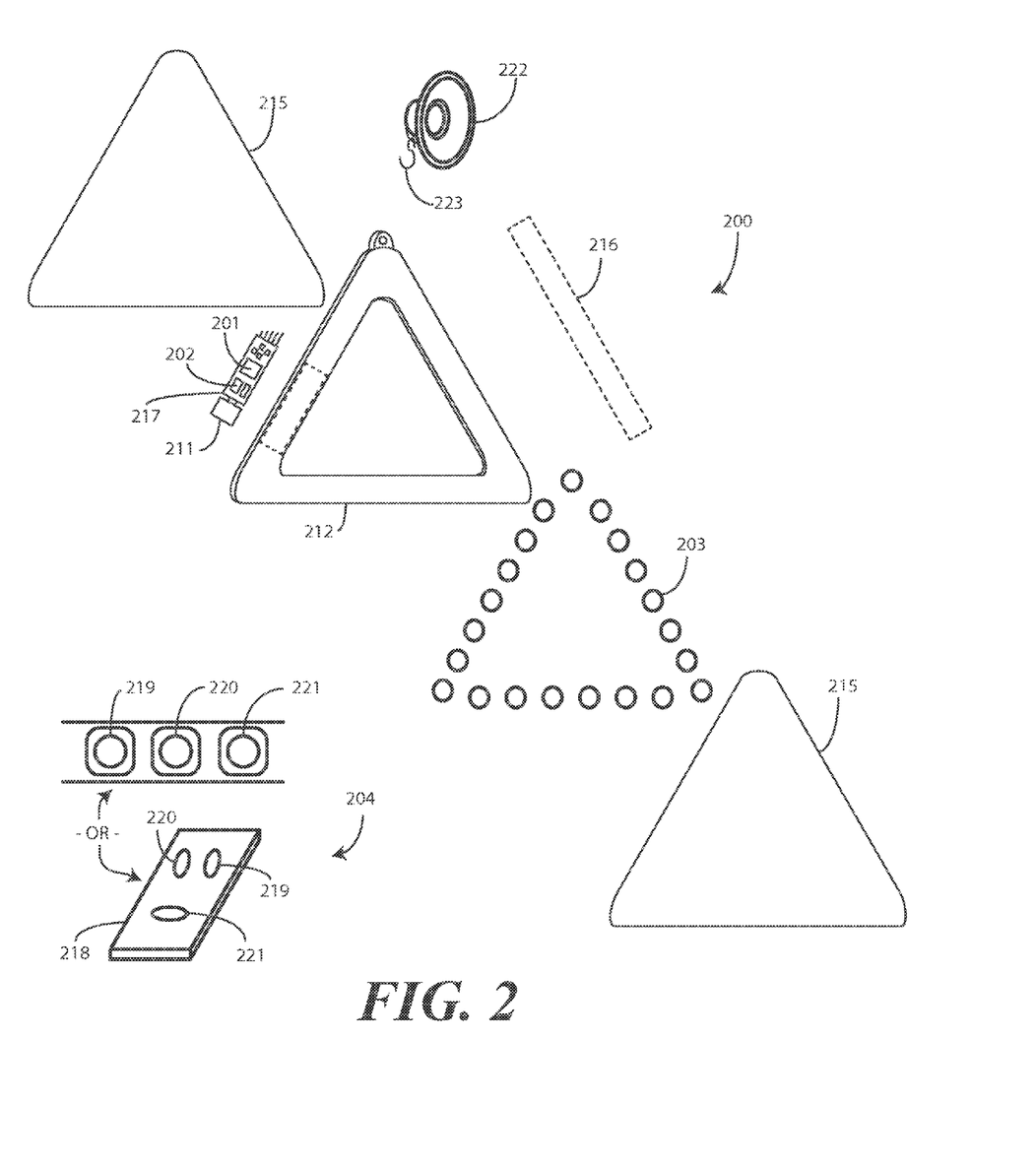
FIG. 2 illustrates one explanatory illuminative device in accordance with one or more embodiments of the disclosure.

Turning now to FIG. 2, illustrated therein is one example of an illuminative device 200 configured in accordance with one or more embodiments of the disclosure. The illustrative illuminative device 200 of FIG. 2 includes a housing 215. The housing 215 of this explanatory embodiment comprises a pellucid or transparent plastic housing. The housing 215 can be colored as well. The housing 215 can be flexible in one embodiment. The housing 215 can be rigid in another embodiment. As described above, the housing 215 can include a stand so that the illuminative device 200 can be mounted in the front or rear dashboard of a vehicle as well.

The illuminative device 200 also includes a chassis 212. The chassis 212 can be manufactured from metal in one embodiment. It can be manufactured from plastic in another embodiment. In one embodiment, the chassis 212 is manufactured from aluminum strips so as to have reflective properties. Optional reflective tape or paint 216 can be applied to the chassis 212 to increase the reflective or light outputting properties of the illuminative device 200.

In this illustrative embodiment, the acceleration detector 202, control circuit 201, energy source 211, and other electronic components are disposed on or coupled to a printed circuit board 217. The printed circuit board 217 can then be disposed within the chassis 212, the housing 215, or combinations thereof.

As previously described, in one embodiment the control circuit 201 is to receive an input from the acceleration detector 202. In one embodiment, the input is received when the acceleration detector 202 detects deceleration beyond a predetermined threshold, such as 0.75 g.

A plurality of light sources 203 can be disposed on or in the housing 215 and/or chassis 212. In this illustrative embodiment, the plurality of light sources 203 comprise LED tape that is disposed along the chassis 212 and within the housing 215. As shown in FIG. 2, the plurality of light sources 203 in this illustrative embodiment is arranged such that the LEDs are in a triangle. As previously described, the plurality of light sources 213 is operable with the control circuit 201.

The control circuit 201 is to, when the input from the acceleration detector 202 indicates deceleration in excess of a threshold, deliver a time-varying control signal to illuminate the plurality of light sources 203 at a time-varying non-zero illumination level ranging from less than thirty percent of a maximum illumination level of the plurality of light sources to more than seventy percent of the maximum illumination level at a predetermined frequency. In one embodiment, the predetermined frequency is less than five Hertz. For example, in one embodiment the predetermined frequency is about two Hertz.

In one embodiment, the housing 215 is manufactured from a pellucid material. For example, in one embodiment the housing 215 can comprise thin, flexible, clear plastic film. Accordingly, when the illuminative device 200 is assembled, the chassis 212 will be pellucid interior to the triangle formed by the plurality of light sources 203.

As shown in FIG. 2, the user interface 204 can take one of two forms. In one embodiment, the user interface 204 comprises a remote control 218 that is wirelessly in communication with the control circuit 201 and other electronic components. The remote control 218 can comprise one or more buttons 219,220,221. In another embodiment, the one or more control buttons 219,220,221 can be disposed along one of the housing 215 or the chassis 212 of the illuminative device. In one embodiment, the first control button 219 is used to actuate the plurality of light sources 203. In one embodiment, the second control button 220 is used to turn OFF the illuminative device 200. In one embodiment, the third control button 221 is used to preclude the plurality of light sources 203 from emitting light while the third control button 221 is actuated.

Figure 3:
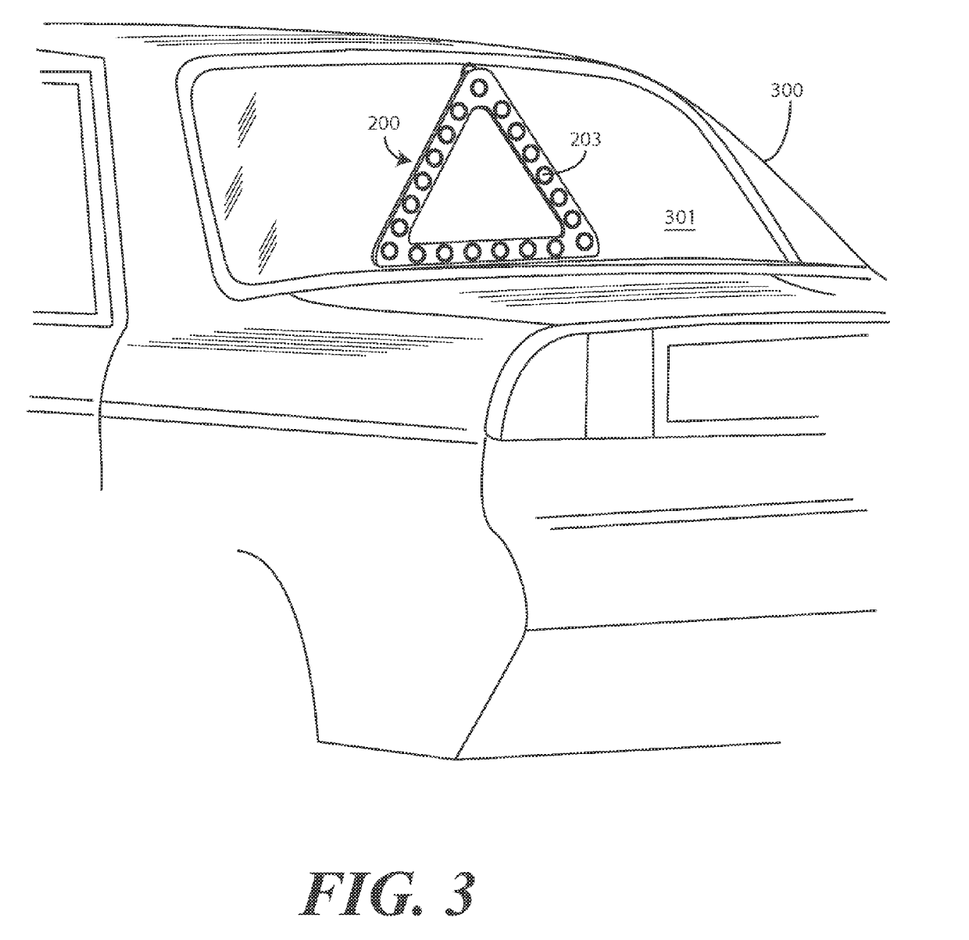
FIG. 3 illustrates one explanatory illuminative device in accordance with one or more embodiments of the disclosure.

The illuminative device 200 of FIG. 2 includes a suction cup 222 and a mechanical connector 223, configured here as a hook, that is suitable for mounting the illuminative device 200 in the rear window of a vehicle. Turning now to FIG. 3, illustrated therein is the illuminative device 200 mounted to the rear window 301 of a vehicle 300 in accordance with one embodiment. When the acceleration detector (202) detects a deceleration rate in excess of a threshold, the triangle formed by the plurality of light sources 203 will emit light modulated by a time-varying signal, such as a square wave, sine wave, triangle wave, or other wave. The illumination level output by the plurality of light sources 203 will always be non-zero in one embodiment, and will vary between a first non-zero illumination level and a second non-zero illumination level. In one embodiment the first non-zero illumination level is less than thirty percent of a maximum illumination level while the second non-zero illumination level is more than seventy percent of the maximum illumination level. In one or more embodiments, the control circuit (201) of the illuminative device 200 includes a timer so that the control circuit (201) can terminate the time-varying control signal causing illumination of the plurality of light sources 203 after a predetermined duration such as 2, 5, 10, 15, or more seconds.

Figure 4:
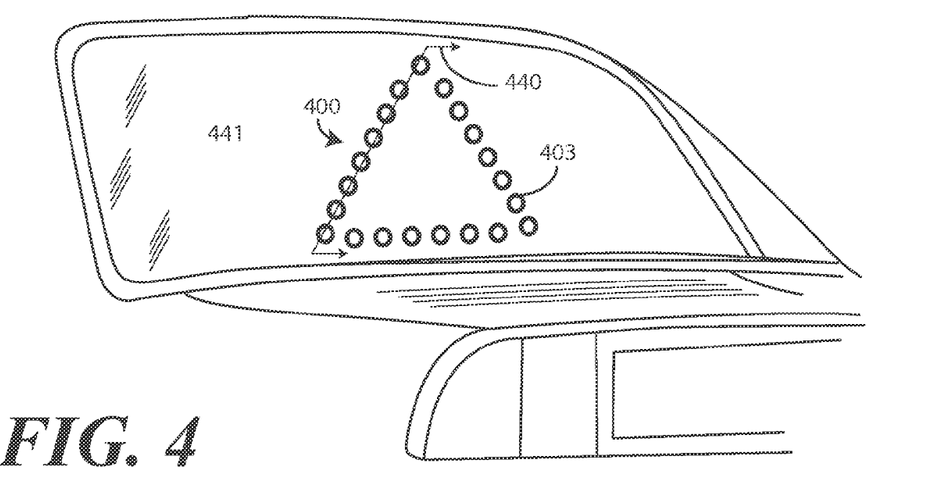
FIG. 4 illustrates another explanatory illuminative device in accordance with one or more embodiments of the disclosure.
Figure 5:
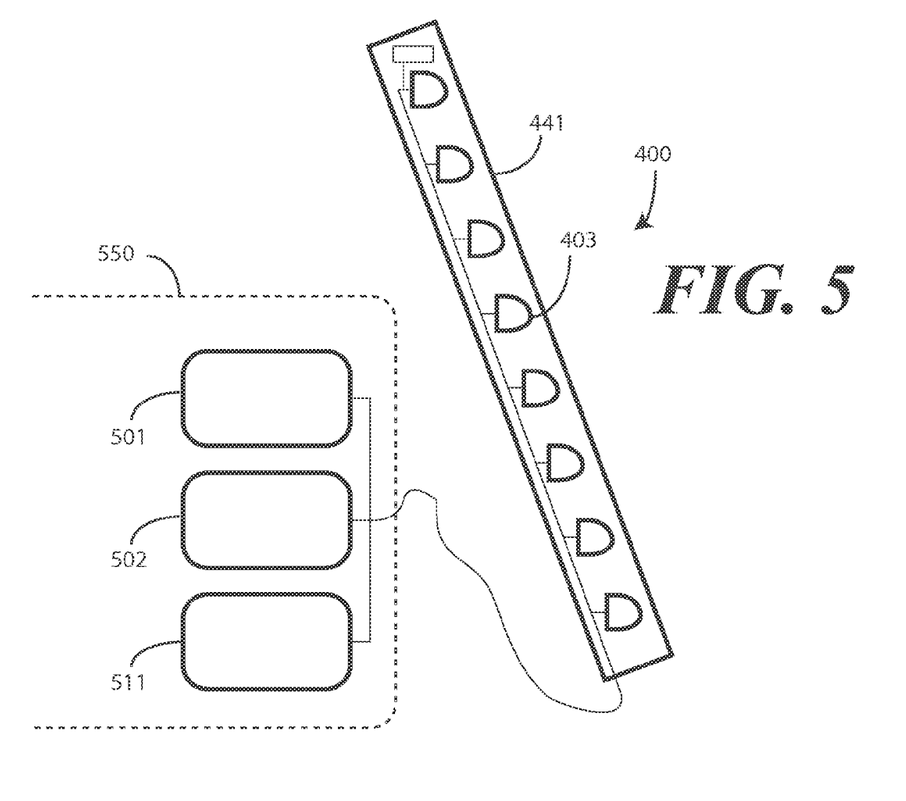
FIG. 5 illustrates a sectional view of another explanatory illuminative device in accordance with one or more embodiments of the disclosure.

Turning now to FIGS. 4 and 5, illustrated therein is an alternate illumination device 400 configured in accordance with one or more embodiments of the disclosure. FIG. 4 illustrates a perspective view of the illumination device 400, while FIG. 5 provides a sectional view delineated by section line 440 of FIG. 4.

In FIGS. 4 and 5, the plurality of light sources 403 are integrated into the rear windshield 441 of the vehicle. The control circuit 501, acceleration detector 502, and energy source 511 are then disposed in a control box 550 disposed elsewhere within the vehicle. In this illustrative embodiment, the energy source 511 comprises a 12-24 volt DC input comprising an electrical port for receiving an electrical cord connected to the vehicle's power supply. The operation of the illumination device 400 of FIGS. 4 and 5 is as described in the method of FIG. 9 below.

Turning now to FIGS. 6-9, illustrated therein are various methods for operating illuminative devices in accordance with one or more embodiments of the disclosure. Beginning with FIG. 6, deceleration 601, detected by an acceleration detector, is plotted on the top graph 660, while the control signal 609 delivered to the plurality of light sources 603 is plotted on the lower graph 661. Deceleration 601 is shown on graph 660 as an absolute value. As shown, when deceleration 601 exceeds a predetermined threshold 662, a control circuit is to deliver the control signal 609 to cause the plurality of light sources 603 to illuminate at an illumination level. In this embodiment, the control signal 609 comprises a time-varying control signal configured as a square wave having a frequency. The frequency of this embodiment is about 2 Hertz.

The plurality of light sources 603 comprises a maximum output illumination level 663. This is typically measured in luminous flux, although other measurements can be used. In the illustrative embodiment of FIG. 6, the plurality of light sources 603 illuminate with an illumination level varying between a first non-zero illumination level 664 and a second non-zero illumination level 665. In one embodiment, the first non-zero illumination level 664 is less than thirty percent of the maximum output illumination level 663. In the illustrative embodiment of FIG. 6, the first non-zero illumination level 664 is about twenty percent of the maximum output illumination level 663. In one embodiment, the second non-zero illumination level 665 is greater than eighty percent of the maximum output illumination level 663. Accordingly, when the control signal 609 is high, large luminous flux 666 is emitted by the plurality of light sources 603. When the control signal 609 is low, small luminous flux 667 is emitted from the plurality of light sources 603. While the control signal 609 is active, the plurality of light sources 603 is continuously emitting light in this embodiment. A control circuit terminates the actuation of the plurality of light sources 603 after a predetermined duration 668, which is five seconds in this example.

Figure 7:
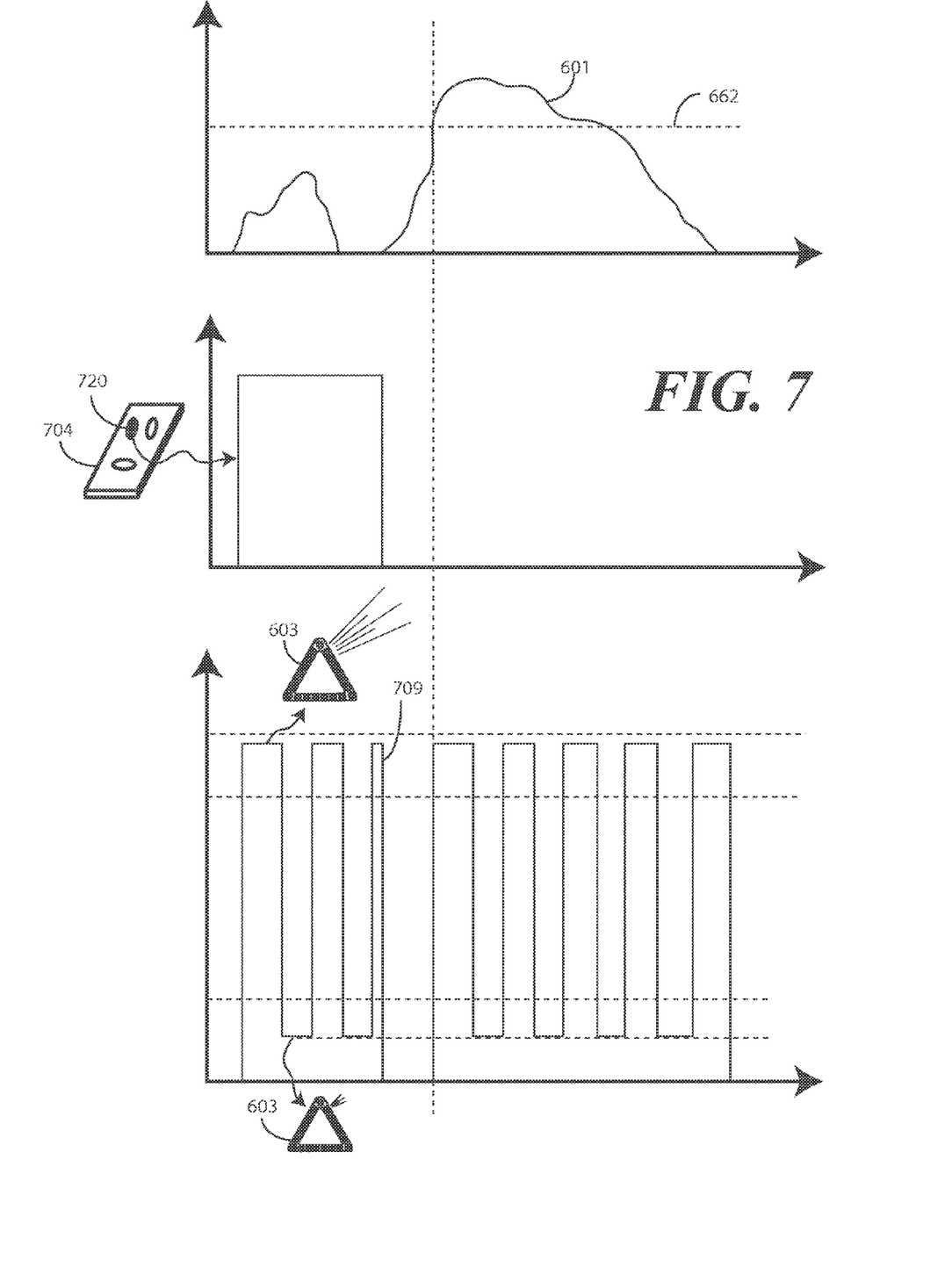
FIG. 7 illustrates another explanatory method in accordance with one or more embodiments of the disclosure.

Turning to FIG. 7, a user has actuated control button 720 of the user interface 704. This causes a control circuit to deliver the control signal 709 independent of the deceleration 601, which is below the predetermined threshold 662 when the control button 720 is being pressed. Accordingly, the plurality of light sources 603 emits light in accordance with the control signal while control button 720 is actuated.

Figure 8:
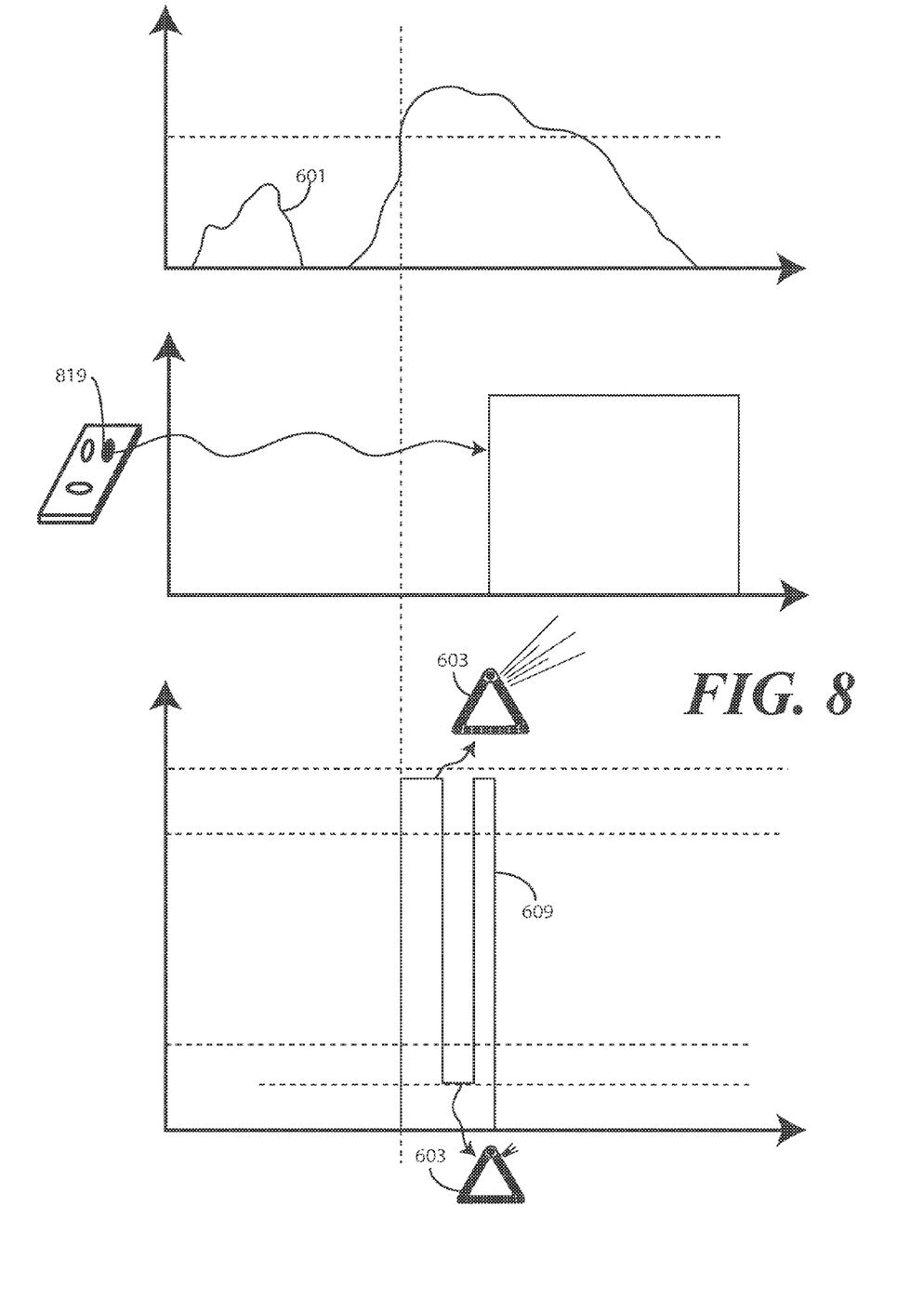
FIG. 8 illustrates another explanatory method in accordance with one or more embodiments of the disclosure.

Turning to FIG. 8, after the deceleration 601 exceeds the threshold, a user has actuated control button 819, which precludes actuation of the plurality of light sources 603. Thus, the user has prematurely terminated the control signal 609, thereby precluding the plurality of light sources 603 from operating for the predetermined duration (668).

Figure 9:
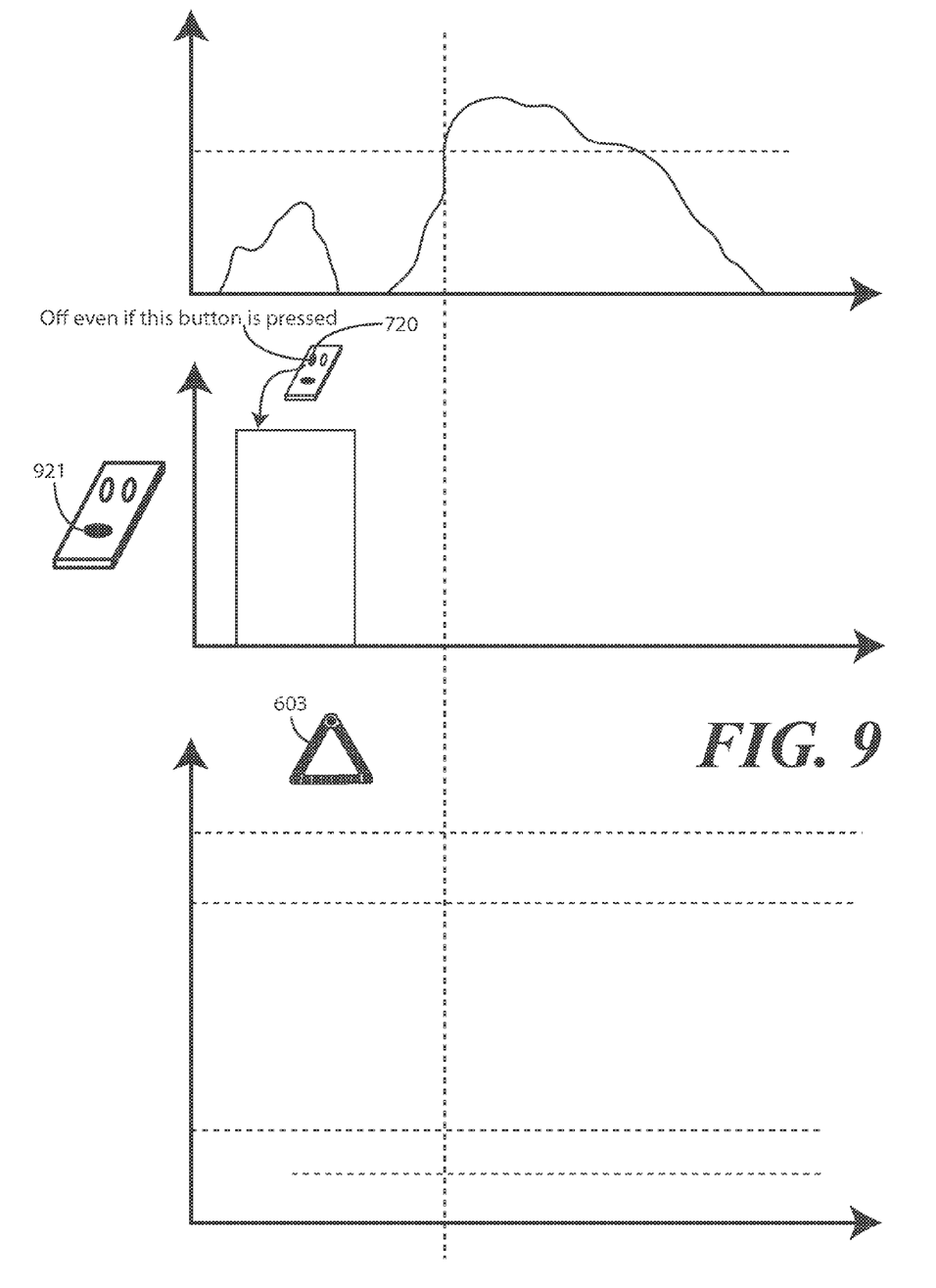
FIG. 9 illustrates another explanatory method in accordance with one or more embodiments of the disclosure.

Turning to FIG. 9, the user has actuated control button 921, which is a master switch in this embodiment. This turns the illuminative device OFF completely. Accordingly, the plurality of light sources 603 does not emit light regardless of what occurs with the deceleration 601. Further, the plurality of light sources 603 when control button 720 is actuated, as shown in the wave form diagrams of FIG. 9. Control button 921 simply turns the illuminative device OFF.

Figure 10:
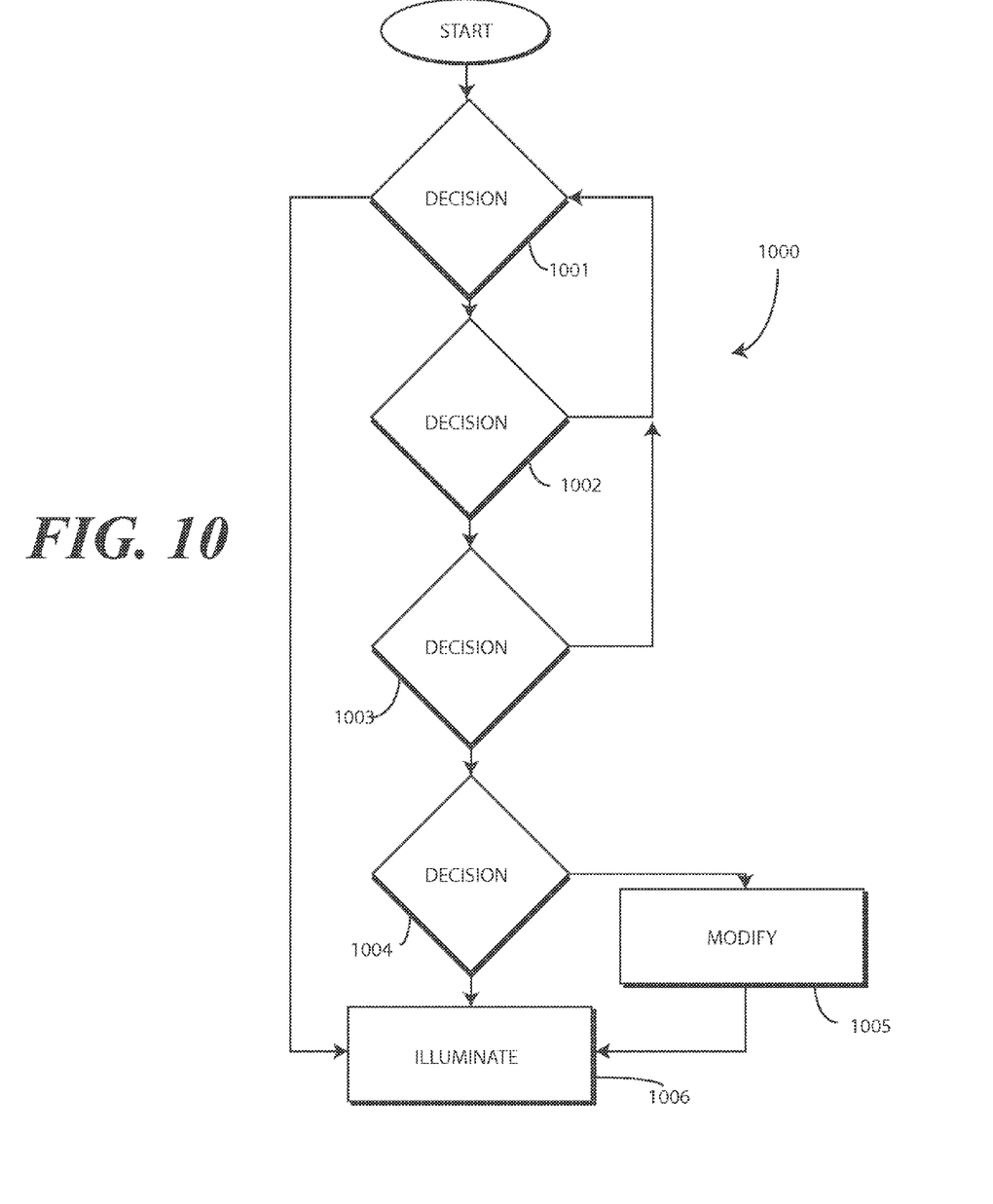
FIG. 10 illustrates another explanatory method in accordance with one or more embodiments of the disclosure.

Turning now to FIG. 10, illustrated therein is one method 1000 for illuminating a plurality of light sources in accordance with one or more embodiments of the disclosure. At decision 1001, the method 1000 checks to see if a user interface has been actuated in such a way as to cause manual illumination of the plurality of light sources. Where it has, the plurality of light sources are illuminated at step 1006.

Where it has not, at decision 1002 the method 1000 checks to see if deceleration in excess of a threshold is detected. Where it has not, the method returns to decision 1001. Where it has, the method proceeds to decision 1003, where the method 1000 checks to see if a user interface has been actuated in such a way as to preclude illumination of the plurality of light sources. Where it has, the method returns to decision 1001. Where it has not, the method 1000 proceeds to decision 1004.

At decision 1004, the method 1000 checks to see if the user interface has been actuated in such a way as to alter the manner in which the plurality of light sources will illuminate. Where it has, the method 1000 proceeds to step 1005 where the control signal delivered to the plurality of light sources is altered in accordance with the user input. After step 1005, and where decision 1004 is negative, the method proceeds to step 1006. At step 1006, the method 1000 causes the plurality of light sources to emit light at time-varying non-zero illumination levels between less than thirty percent of a maximum illumination level and more than seventy percent of the maximum illumination level.

Figure 11:
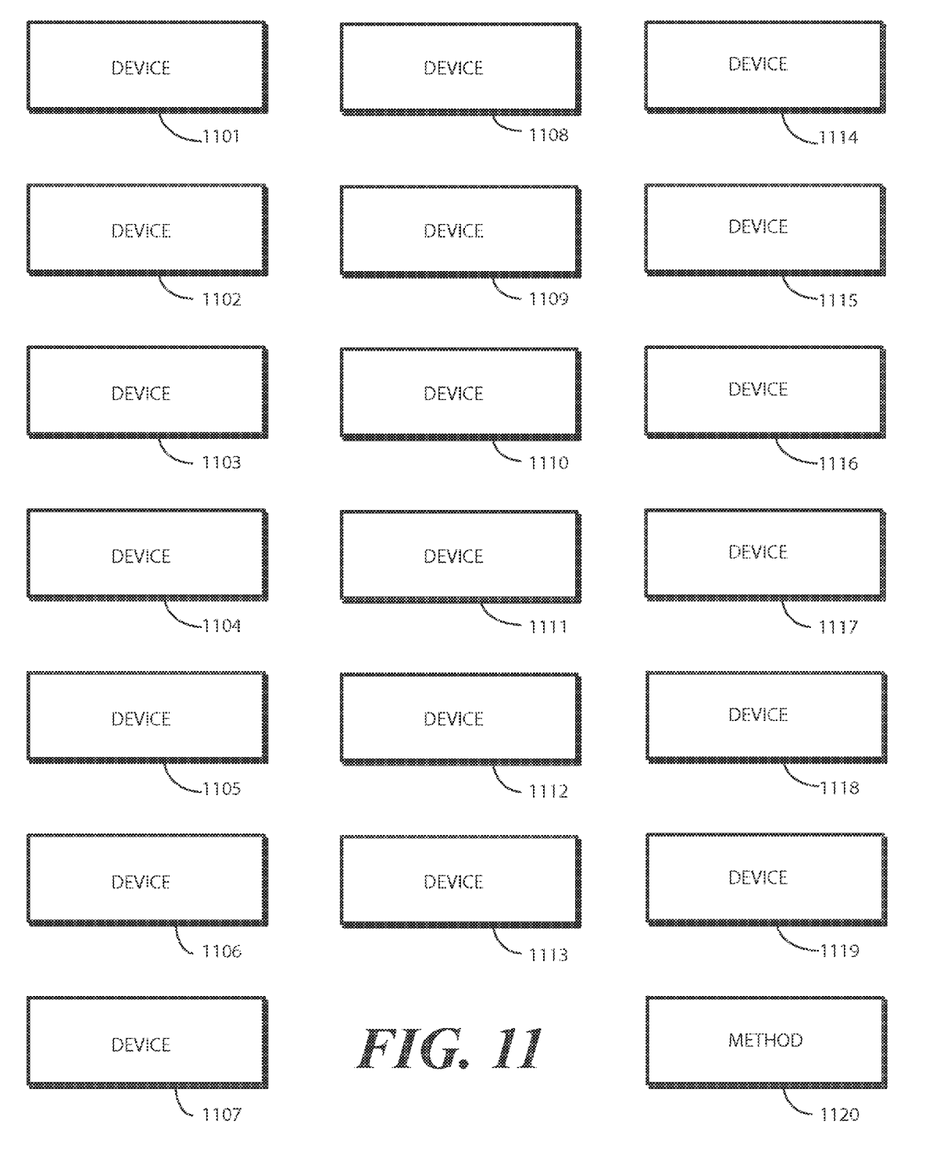
FIG. 11 illustrates another explanatory method in accordance with one or more embodiments of the disclosure.

Turning now to FIG. 11, illustrated therein are various embodiments of the disclosure. At 1101, an illuminative device comprises a control circuit, an acceleration detector operable with the control circuit, and a plurality of light sources operable with the control circuit. At 1101, the control circuit is to receive an input from the acceleration detector indicating deceleration exceeds a predetermined threshold. At 1101, the control circuit is to, upon receipt of the input, deliver a time-varying control signal to continuously illuminate the plurality of light sources with an illumination level varying between a first non-zero illumination level and a second non-zero illumination level in accordance with a frequency of the time-varying control signal.

At 1102, each light source of the plurality of light sources comprises a maximum output illumination level. At 1102, the first non-zero illumination level of 1101 is less than thirty percent of the maximum output illumination level. At 1103, the second non-zero illumination level of 1101 is greater than eighty percent of the maximum output illumination level. At 1104, the first non-zero illumination level of 1102 is about twenty percent of the maximum output illumination level.

At 1105, the predetermined threshold of 1101 is about seventy-five percent of one standard gravity. At 1106, the frequency of 1101 is less than five Hertz. At 1107, the frequency of 1101 is about two Hertz.

At 1108, the illuminative device of 1101 further comprises a chassis coupled to or integrated with the plurality of light sources. At 1109, the plurality of light sources are arranged to form a triangle. At 1101, the chassis of 1108 is the chassis pellucid interior the triangle. At 1111, the illuminative device of claim 1108 further comprises a detachable connector to attach the chassis to a window of a vehicle. At 1112, the detachable connector of 1111 comprises a suction cup.

At 1113, the plurality of light sources of 1101 is integral with a window of a vehicle. At 1114, the illuminative device of 1101 further comprises a control switch to, when actuated, cause the control circuit to deliver the time-varying control signal independent of the input. At 1115, the illuminative device of 1114 further comprises a master switch to prevent illumination of the plurality of light sources when actuated. At 1116, one or more of the control switch or the master switch of 1114 is wirelessly in communication with the control circuit. At 1117, the plurality of light sources of 1101 comprises a plurality of light emitting diodes to emit red light.

At 1118, an illuminative device comprises a housing. At 1118, the illuminative device comprises an acceleration detector disposed in the housing. At 1118, the illuminative device comprises a control circuit disposed in the housing to receive an input from the acceleration detector. At 1118, the illuminative device comprises a plurality of light sources disposed on or in the housing, arranged in a triangle and operable with the control circuit. At 1118, the control circuit is to, when the input indicates deceleration in excess of a threshold, deliver a time-varying control signal to illuminate the plurality of light sources at a time-varying non-zero illumination level ranging from less than thirty percent of a maximum illumination level of the plurality of light sources to more than seventy percent of the maximum illumination level at a predetermined frequency. At 1119, the control circuit of 1118 is to terminate the time-varying control signal after a predetermined duration.

At 1120, a method of illuminating a plurality of light sources arranged as a warning triangle is provided. At 1120, the method comprises detecting deceleration in excess of a threshold. At 1120, the method comprises causing the plurality of light sources to emit light at time-varying non-zero illumination levels between less than thirty percent of a maximum illumination level and more than seventy percent of the maximum illumination level.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An illuminative device, comprising:
a control circuit;
an acceleration detector operable with the control circuit; and
a plurality of light sources operable with the control circuit;
the control circuit to:
receive an input from the acceleration detector indicating deceleration exceeds a predetermined threshold; and
upon receipt of the input, deliver a time-varying drive signal to continuously illuminate the plurality of light sources with an illumination level varying between a first non-zero illumination level and a second non-zero illumination level as the time-varying drive signal varies between a first positive magnitude to illuminate the plurality of light sources at the first non-zero illumination level and a second positive magnitude to illuminate the plurality of light sources at the second non-zero illumination level.

2. The illuminative device of claim 1, each of the plurality of light sources comprising a maximum output illumination level, the first non-zero illumination level less than thirty percent of the maximum output illumination level.

3. The illuminative device of claim 2, the second non-zero illumination level greater than eighty percent of the maximum output illumination level.

4. The illuminative device of claim 3, the first non-zero illumination level about twenty percent of the maximum output illumination level.

5. The illuminative device of claim 1, the predetermined threshold about seventy-five percent of one standard gravity (g).

6. The illuminative device of claim 1, the frequency less than five Hertz.

7. The illuminative device of claim 6, the frequency about two Hertz.

8. The illuminative device of claim 1, further comprising a chassis coupled to or integrated with the plurality of light sources.

9. The illuminative device of claim 8, the plurality of light sources arranged to form a triangle.

10. The illuminative device of claim 9, the chassis pellucid interior the triangle.

11. The illuminative device of claim 8, further comprising a detachable connector to attach the chassis to a window of a vehicle.

12. The illuminative device of claim 11, the detachable connector comprising a suction cup.

13. The illuminative device of claim 1, the plurality of light sources integral with a window of a vehicle.

14. The illuminative device of claim 1, further comprising a control switch to, when actuated, cause the control circuit to deliver the time-varying drive signal independent of the input.

15. The illuminative device of claim 14, further comprising a master switch to prevent illumination of the plurality of light sources when actuated.

16. The illuminative device of claim 15, one or more of the control switch or the master switch wirelessly in communication with the control circuit.

17. The illuminative device of claim 1, the plurality of light sources comprising a plurality of light emitting diodes to emit red light.

18. An illuminative device, comprising:
a housing;
an acceleration detector disposed in the housing;
a control circuit disposed in the housing to receive an input from the acceleration detector; and
a plurality of light sources disposed on or in the housing, arranged in a triangle and operable with the control circuit;
the control circuit to, when the input indicates deceleration in excess of a threshold, deliver a time-varying drive signal to illuminate the plurality of light sources at a time-varying non-zero illumination level ranging from less than thirty percent of a maximum illumination level of the plurality of light sources to more than seventy percent of the maximum illumination level at a predetermined frequency as the time-varying drive signal varies between a first positive magnitude to illuminate the plurality of light sources at a first non-zero illumination level and a second positive magnitude to illuminate the plurality of light sources at a second non-zero illumination level.

19. The illuminative device of claim 18, the control circuit to terminate the time-varying drive signal after a predetermined duration.

20. A method of illuminating a plurality of light sources arranged as a warning triangle, comprising:

detecting deceleration in excess of a threshold; and
causing, with a time-varying drive signal, the plurality of light sources to emit light at time-varying non-zero illumination levels between less than thirty percent of a maximum illumination level and more than seventy percent of the maximum illumination level as the time-varying drive signal varies between a first positive magnitude to illuminate the plurality of light sources at a first non-zero illumination level and a second positive magnitude to illuminate the plurality of light sources at a second non-zero illumination level.

* * * * *